Figure 2:
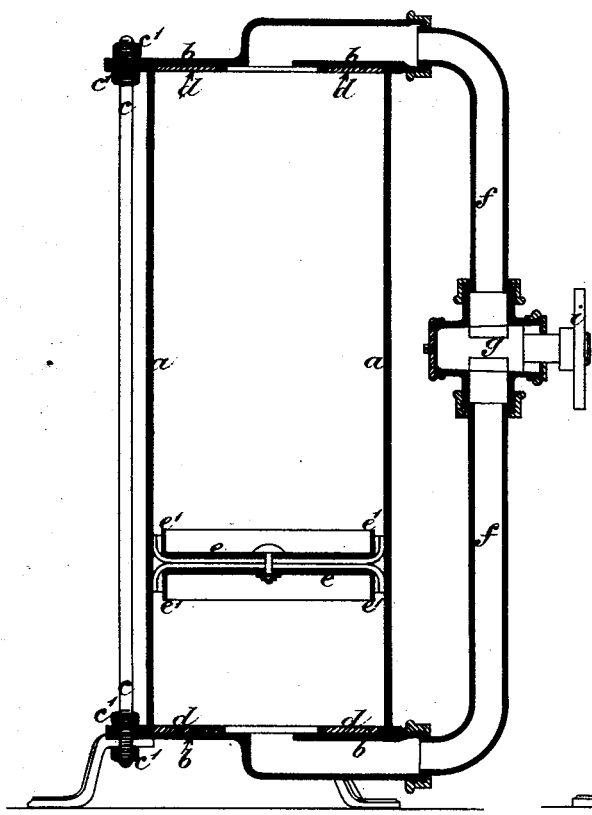

E. A. PONTIFEX.
Liquid-Measure.

No. 162,575.

2 Sheets--Sheet 1.

Patented April 27, 1875.

Witnesses.
Harry King
H. H. Young

Inventor.
Edmund A. Pontifex
By his Attorney,
Wm. D. Baldwin

THE GRAPHIC CO. PHOTO-LITH. 39 & 41 PARK PLACE, N.Y.

2 Sheets--Sheet 2.

E. A. PONTIFEX.
Liquid-Measure.

No. 162,575. Patented April 27, 1875.

Witnesses.
Harry King.
H. H. Young.

Inventor.
Edmund A. Pontifex.
By his Attorney.
Wm. D. Baldwin

UNITED STATES PATENT OFFICE.

EDMUND ALFRED PONTIFEX, OF LONDON, ENGLAND.

IMPROVEMENT IN LIQUID-MEASURES.

Specification forming part of Letters Patent No. 162,575, dated April 27, 1875; application filed December 16, 1874.

*To all whom it may concern:*

Be it known that I, EDMUND ALFRED PONTIFEX, of the Farringdon Works, Shoe Lane, in the city of London, England, a subject of the Queen of Great Britain, have invented or discovered new and useful improvements in apparatus to be used in drawing off water and other liquors, and in measuring the quantities drawn off; and I, the said EDMUND ALFRED PONTIFEX, do hereby declare the nature of the said invention, and in what manner the same is to be performed, to be particularly described and ascertained in and by the following statement thereof—that is to say:

This invention has for its object improvements in apparatus to be used in drawing off water and other liquors.

For the purpose of drawing off a measured quantity of water or liquor at each operation I employ an apparatus consisting of a cylinder which is closed by a cap at each end. Within the caps are vulcanized india-rubber disks, which serve to render the joints water-tight, the ends of the cylinder being pressed into water-tight contact with the disk. A pipe or water-passage is connected to each cap, and these pipes or passages pass to the opposite sides of the shell of a four-way cock. The other two pipes or passages connected with the four-way cock communicate the one with the supply and the other with the outlet for the measured quantities of liquid. Within the cylinder is a piston packed with two cupped leathers, or otherwise rendered water-tight, or approximately water-tight. When the piston is at rest the water-pressure on one side of it holds it at one end of the cylinder, and then a raised ring upon it rests in water-tight contact with the india-rubber disk, so that then, quite independently of the packing of the piston, water is prevented from leaking past it.

When it is required to draw off water or other liquid the plug of the four-way cock is turned one-quarter round, so that the pressure in the supply-pipe may be thrown upon the other side of the piston, while the water or liquid is allowed to escape to the place where it is required from that side of the piston on which it was previously retained under pressure. The piston then travels from end to end of the cylinder, discharging a measured quantity of water or liquid, and the piston comes again to rest at the other end of the cylinder, making a water-tight joint against the disk in the cap, as before, and then the flow ceases.

Thus it will be seen that the apparatus consists essentially of a floating piston, which, when at rest, is held by the pressure in water-tight contact with a surface, in such manner as to close the passage to the outlet, and which, also, can be driven from one end of the measuring-cylinder to the other by the pressure of the liquid itself being applied alternately first to one end of the cylinder and then to the other by means of a four-way cock or other equivalent device communicating between the ends of the cylinder and the supply-main and outlet.

The apparatus may be very usefully applied as a measure or tell-tale; for instance, if applied to a beer-engine, and a counting-machine is attached, it will show the number of measures for which they ought to have received payment; or it might be used as a water or other liquid meter.

The apparatus might consist of a round ball, fitting loosely in a cylinder, and closing into a cup-joint at either end of the cylinder.

In order that my said invention may be most fully understood and readily carried into effect, I will proceed to describe the drawings hereunto annexed.

Figure 1:
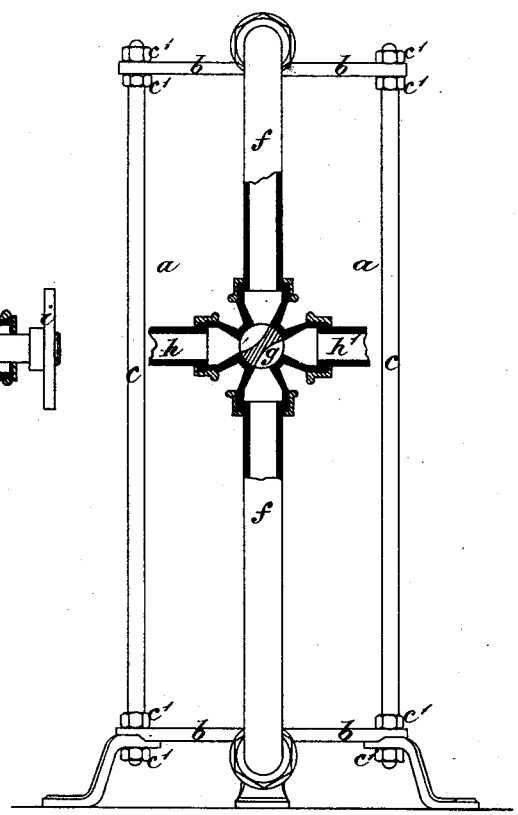
Figure 3:
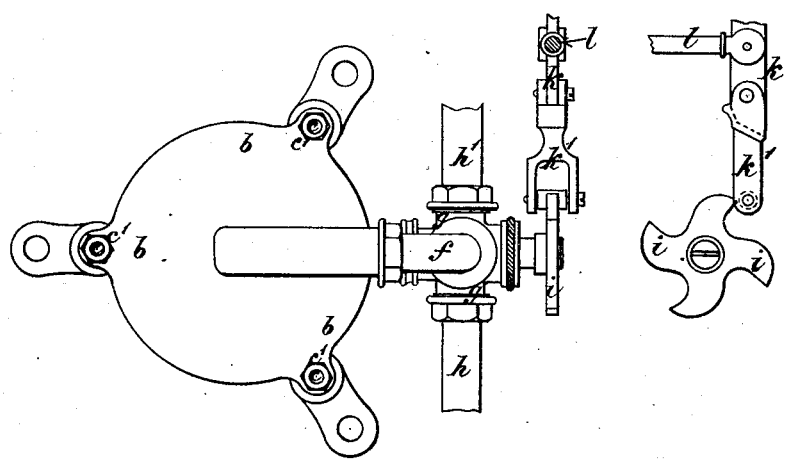

Figure 1 is an elevation, partly in section. Fig. 2 is a longitudinal section, and Fig. 3 is a plan of apparatus constructed according to my invention.

$a\ a$ is a cylinder, with ends or covers $b\ b$ secured by longitudinal rods $c$, which are screwed to receive nuts $c'\ c'$. The covers are recessed to hold vulcanized india-rubber rings $d\ d$, which serve to render tight the joints between the cylinder and the covers. $e$ is a piston, as shown in the drawings. It is provided with cup-leathers; but it may be packed in any manner which will admit of its moving freely in the cylinder, and it is not essential that the fit to the sides of the cylinder should be water-tight, for whenever the piston is at rest at either end of the cylinder a rim, $e'$, upon it beds directly upon the vulcanized india-rubber packing-ring $d$, and prevents leakage. The pipes $ff$ are connected with the cylinder ends. They serve alternately as the inlet and outlet to the cylinder. They communicate with the shell of the four-way cock $g$, to which are also connected the supply-pipe $h$ and the delivery-pipe $g$. $i$ is a four-armed wheel fixed on the plug of the cock $g$, and $k$ is a lever capable of turning on a fixed center. At its farther end it carries a finger, $k'$, jointed to it. $l$ is a rod, by which the lever $k$ is lifted when it is desired to draw water; the finger $k'$ then turns the plug of the cock one-quarter round. When the lever $k$ returns the joint allows the finger $k'$ to yield and pass the arm of the wheel $i$.

This arrangement is suitable for a water-closet, but by any convenient means the plug of the cock may be turned.

What I claim is—

The arrangement, substantially as described, of apparatus to be used in drawing off water and other liquors, and in measuring the quantities drawn off, such apparatus consisting of a cylinder or vessel, with inlet and outlet passages, and a piston, which, when at rest at the end of its stroke, is held by the pressure upon it up to a surface, and so closes the way to the outlet independently of any packing with which the piston may be provided, to keep it approximately water-tight as it traverses from end to end of the cylinder or vessel in which it operates.

EDMUND A. PONTIFEX.

Witnesses:
  THOMAS LAKE,
  G. ROUSHAM,
*Both of No. 17 Gracechurch Street, London.*